April 19, 1955 F. J. LENGVENIS 2,706,765
CONTROL CIRCUITS
Filed March 20, 1952
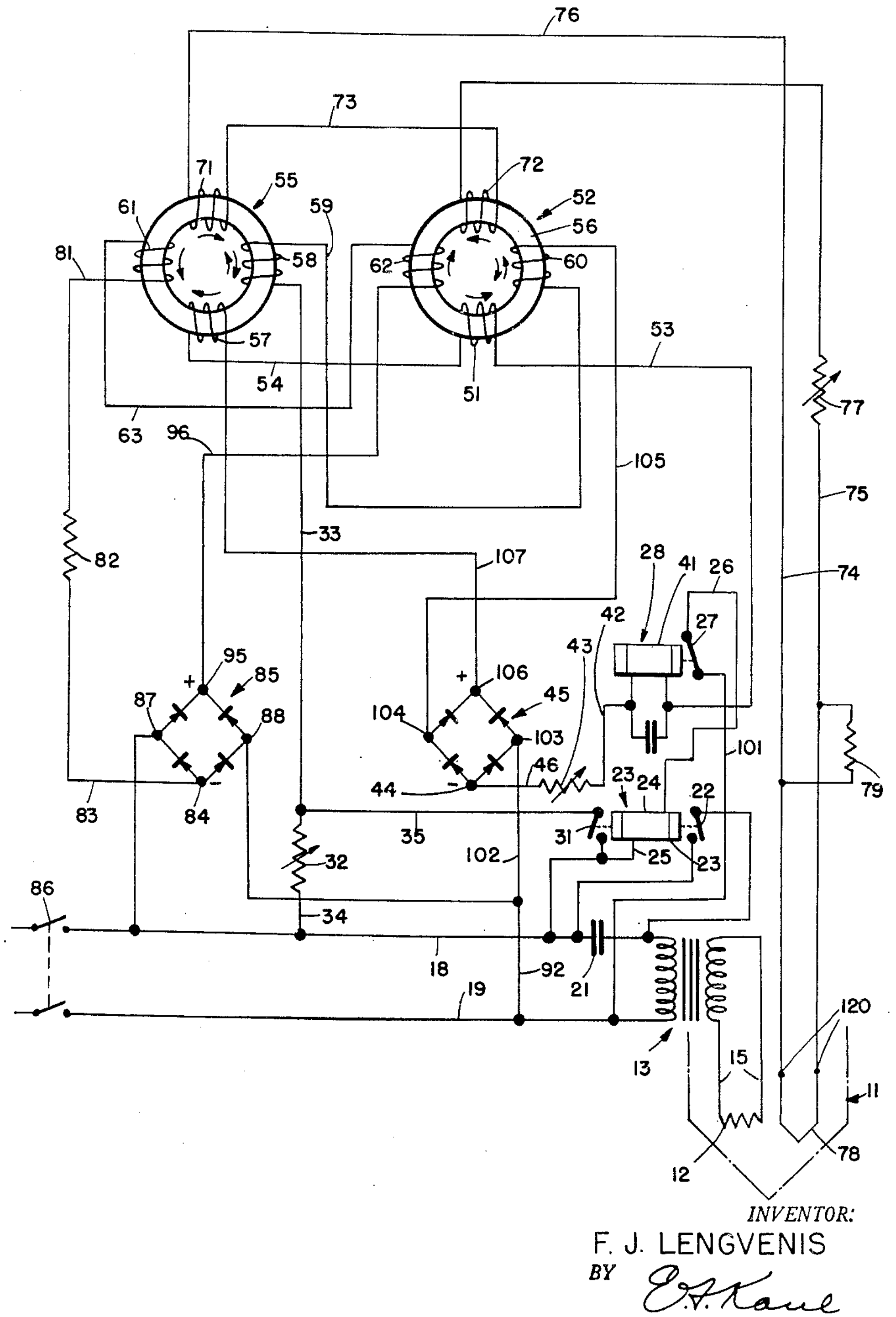
INVENTOR:
F. J. LENGVENIS
BY E. A. Kane
ATTORNEY

United States Patent Office 2,706,765

Patented Apr. 19, 1955

2,706,765

CONTROL CIRCUITS

Frank J. Lengvenis, Momence, Ill., assignor to Western Electric Company, Incorporated, New York, N. Y., a corporation of New York Application March 20, 1952, Serial No. 277,692

9 Claims. (Cl. 219—20)

This invention relates to control circuits, and more particularly to circuits for controlling the supply of power to heating elements of soldering irons, or the like.

In the use of soldering irons which are heated by electrical resistances, it is desirable to heat the irons quickly to a working temperature and maintain that temperature with a minimum of power. Various control circuits for effecting this have been proposed, but none have been effective to both keep the temperature of the soldering irons within a narrow range and rapidly heat the soldering irons to the desired temperature when they are started in use.

An object of the invention is to provide new and improved control circuits.

Another object of the invention is to provide new and improved circuits for controlling the supply of power to the heating elements of soldering irons, or the like.

A further object of the invention is to provide control circuits for heating soldering irons to working temperatures rapidly, and for maintaining the soldering irons within a narrow, optimum range of temperature.

In accordance with one embodiment of the invention, there may be provided a heating element for a soldering iron, or the like, supplied with power from a power source. A thermocouple responsive to the temperature of the element to be heated is connected to a control winding of a magnetic amplifier having a bias winding, an output winding and a feedback winding. Relay means responsive to the output winding of the magnetic amplifier cut off the power source to the heating element when the soldering iron is at the maximum temperature desired and connect the power supply to the heating element when the temperature of the iron drops to the minimum desired. Current limiting means and means for shunting the current limiting means are connected in the circuit with the magnetic amplifier windings to compensate for imperfect voltage regulation of the power supply.

A complete understanding of the invention may be obtained from the following detailed description of a circuit forming a specific embodiment thereof, when read in conjunction with the appended drawings, in which the single figure is a schematic view of a control circuit forming one embodiment of the invention.

Referring now in detail to the drawing, there is shown therein an apparatus for controlling the temperature of the tip 10 of a soldering iron 11. This apparatus includes a resistance 12 connected by leads 15 to the secondary winding of a transformer 13 for heating the soldering iron. The primary winding of the transformer is connected to conductors 18 and 19 of a power line 20 leading from a source of alternating current (not shown). A condenser 21 is mounted in the conductor 18 in parallel with a normally open contact 22 of a relay 23. The relay 23 is provided with a winding 24 connected by a conductor 25 to the conductor 18 and connected by a conductor 26 to a contact 27 of a low differential relay 28. The relay 23 also includes a normally open contact 31 connected in parallel with an adjustable resistance 32 to a conductor 33 by a conductor 35 and the conductor 25. The adjustable resistance 32 is connected to the conductor 18 by a conductor 34.

The relay 28 includes a winding 41 connected by a conductor 42 to an adjustable resistance 43 connected to a negative terminal 44 of a rectifier 45 by a conductor 46. The other side of the winding 41 is connected to a feedback winding 51 of a magnetic amplifier 52 by a conductor 53. The magnetic amplifier 52 includes cores 55 and 56 of high permeability material, and also includes a second feedback winding 57 connected in series with the feedback winding 51 by the conductor 54. An output winding 58 is connected by a conductor 59 to a second output winding 60. Bias windings 61 and 62 connected in series with one another by a conductor 63 are wound on the cores 55 and 56, respectively. Control windings 71 and 72 on the cores 55 and 56 are connected in series by a conductor 73, and are connected by conductors 75 and 76 and an adjustable resistance 77 to a thermocouple 78 which is mounted in the soldering iron 11 in close proximity to the tip 10 thereof so that the temperature at the junction of the thermocouple is always substantially the same as that of the tip. A high resistance 79 is connected to the conductors 74 and 75 to provide a high resistance path parallel to the thermocouple.

One side of the bias winding 61 is connected to a circuit including a conductor 81, a resistance 82 and a conductor 83 connected to a negative terminal 84 of a rectifier 85. A conductor is connected to an alternating current terminal 87 of the rectifier 85. A second alternating current terminal 88 of the rectifier 85 is connected by a conductor to a resistance 90, and conductors 91 and 92 connect the resistance 90 to the conductor 19 of the power line. A positive terminal 95 of the rectifier 85 is connected by a conductor 96 to the bias winding 62. Thus, current flows continuously through the bias windings 61 and 62 from the D. C. terminals 84 and 95 of the rectifier 85.

A conductor 101 connects the conductor 19 of the power line to the normally closed contact 27 of the relay 28. The conductor 92 and a conductor 102 connect the conductor 19 of the power line to an A. C. terminal 103 of the rectifier 45, and a second A. C. terminal 104 of the rectifier 45 is connected by a conductor 105 to the output winding 60. A positive terminal 106 of the rectifier 45 is connected by a conductor 107 to the feedback winding 57. A manually operable switch 111 is provided in the conductors 18 and 19 of the power line 20. A condenser 112 connected in parallel with the relay winding 41 smooths out the pulsating D. C. to the relay winding 41 to prevent chattering thereof. The pairs of D. C. windings 51 and 57, 60 and 61 and 71 and 72 are so wound on the cores 55 and 56 that A. C. induced in one winding of each pair is cancelled by A. C. induced in the other winding of that pair. Detachable connectors 120 are provided in the conductors 74 and 75, and detachable connectors 122 connect the leads 15 to the secondary winding of the transformer 13.

*Operation*

When the switch 86 is closed, the relay winding 24 is energized through the normally closed contact 27 so that current flows from the power line through the normally open contact 22 and the transformer 13 to cause the heating element 12 to heat the iron 10. A D. C. current flows through the bias windings 61 and 62 from the rectifier 85 in such directions as to create flux through the rings 55 and 56 in the directions of the arrows adjacent to the windings 61 and 62, the resistance 82 reducing any leakage from the rectifier 85. Current flows through the output windings 58 and 60 from the power line 20 through a circuit including the conductor 25, the contact 31, the conductors 35 and 33, the winding 58, the conductor 59, the winding 60, the conductor 105, the rectifier 45, the conductor 107, the feedback windings 57 and 51, the conductor 53, the relay winding 41, the conductor 42, the resistance 43, the conductor 46, the rectifier 45 and the conductors 102 and 92. The direction of the current flowing through the feedback windings 57 and 51 is such that flux sets up flows in directions of the arrows adjacent thereto, which are opposite to the flux set up by the respective bias windings 61 and 72, and in the same directions as the flux created by the respective control windings 71 and 72.

Alternating current flows through the output windings 58 and 60 so that these windings do not tend to upset the balance between the bias windings on the one end and the feedback windings on the other. Current generated in the thermocouple 78 flows through the windings 71 and 72 in such directions so as to create flux in the directions of the arrows adjacent to these windings, the flux created by the winding 71 being in the same direction as that created by the feedback winding 57, and the flux created by the control winding 72 being in the same direction as that created by the feedback winding 51. At this time, while the iron 10 is below the desired maximum temperature, the flux created by each of the feedback windings 57 and 51 and the aiding control windings is approximately equal to the flux created by each of the bias windings 61 and 62 so that these flux cancel one another. The soldering iron being cold so that there is very little current flowing through the control windings 71 and 72, the cores 55 and 56 are not saturated by flux from the output windings 58 and 60 so that the current flow through the output windings 58 and 60 is limited by relatively high inductive reactance and the winding 41 of the relay winding 28 is not energized sufficiently to break the normally closed contact 27. Hence, the contact 27 keeps the circuit to the winding 24 of the relay 23 closed so that contacts 22 and 31 are held closed. The contact 22 being closed, the condenser 21 is shunted and power is supplied to the transformer 13 so that a high current flows through the heating element 12 to rapidly heat the soldering iron 11 to soldering temperature, which occurs within twenty seconds after the switch 111 is closed.

When the temperature of the tip 10 reaches the maximum desired, the thermocouple 78 generates sufficient current through the control windings 71 and 72 to cause saturation of the cores 55 and 56, during half the cycles of the A. C. output windings 58 and 60. This reduces the inductive reactance of the output windings 58 and 60, and a larger current flows therethrough and through the D. C. feedback windings 57 and 51, which further increases the saturation of the cores 55 and 56. The current through the output windings 58 and 60 then goes even higher. The increased current energizes the winding 41 of the relay 28 to break the contact 27 to the winding 24 of the relay 23, thereby deenergizing the relay 23. This causes contacts 22 and 31 to drop out. Opening of the contact 22 cuts off power from the transformer 18 to stop current to the heating element 12. This causes the voltage across the power line conductors 18 and 19 to rise, and opening of the contact 31 stops the shunting of the resistance 32 of the output windings 58 and 60 to compensate for the rise in voltage across the power line conductors 18 and 19.

As the soldering iron 11 cools somewhat from its maximum temperature toward the desired minimum temperature, current flow through the control windings 71 and 72 decreases, which decreases the saturation of the cores 55 and 56. When the temperature of the tip 10 of the soldering iron 11 reaches the minimum value, the flow through the control windings 71 and 72 has been reduced to such an extent that the inductive reactance of the output windings 58 and 60 is sufficiently high to cause the winding 41 of the relay 28 to be deenergized. This causes making of the contact 27, and the winding 24 of the relay 23 is again energized to close the contacts 22 and 31 to start another heating cycle. Closing of the contact 31 shunts the resistance 22, which is adjusted to compensate for the voltage drop of the power line 20 when the load of the heating element 12 is placed on the power line. When the connections 120 and 122 are broken to disconnect the soldering iron from the control circuit, the high resistance 79 permits any leakage current from the other windings to the control windings to flow to prevent energizing the relay 28.

One successful, commercially available relay used for relay 28 has a differential value of seven to five; i. e. seven units of current flowing through the winding 41 actuate the relay and only five units of current flowing through the winding 41 permit the relay to drop out. Hence, the temperature of the soldering iron tip is kept within a narrow optimum range, which can be adjusted higher or lower by adjustment of the resistances 43 and 75.

The above-described control circuit causes quick heating of soldering irons and maintains soldering irons within a very narrow temperature range. This apparatus is rugged and sensitive while inexpensive and simple in construction and operation.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A control circuit, which comprises a power source, an electrical element to be controlled, means for connecting the element to be controlled to the power source and for disconnecting the same, means electrically responsive to the condition of the element to be controlled, a magnetic amplifier having a saturable permeable core, a control winding and an output winding connecting the power source to the connecting means, said windings being in parallel with the element to be controlled, means responsive to the condition of the element to be controlled for supplying current to the control winding, impedance means, means connecting the impedance means in series with the output winding of the magnetic amplifier, and means for shunting the impedance means when the element to be controlled is connected to the power source.

2. A control circuit, which comprises an A. C. power source, an electrical heating element to be controlled, relay means for connecting the heating element to be controlled to the power source and for disconnecting the same, a thermocouple responsive to the heat from the heating element, a magnetic amplifier having a saturable permeable core, a control winding and an output winding connecting the power source to the relay means, said output winding serving to limit current to the relay means sufficiently to prevent actuation thereof when said core is not saturated, means connecting the thermocouple to the control winding, impedance means, means connecting the impedance means in series with the output winding, and means for shunting the impedance means when the heating element is connected to the power source.

3. A circuit for controlling the temperature of a heated unit, which comprises a heating resistance, an A. C. power line including a pair of conductors, relay means provided with a winding, a normally closed contact normally connecting the resistance operatively to the power line and a second contact, an annular core of permeable material, an output winding wound on the core, a control winding wound on the core, a bias winding wound on the core, a feedback winding wound on the core, a thermocouple responsive to heat from the resistance and connected in series with the control winding, an adjustable resistance connected in series with the thermocouple and the control winding, a high resistance shunting the control winding, a second adjustable resistance, means connecting the second adjustable resistance and the second relay contact in parallel to one conductor of the power line and the output winding, rectifier means connecting the other conductor of the power line to the output winding and the feedback winding in series with the output winding for creating flux in the core in the same direction as that created by the control winding, rectifier means connecting the bias winding to the power line in such a manner that flux created by the bias winding opposes that created by the feedback winding and the control winding, and means responsive to a predetermined current flow through the output winding for actuating the relay.

4. A circuit for controlling the temperature of a heated unit, which comprises a heating resistance, an A. C. power line including a pair of conductors, a relay provided with a winding and a normally closed contact, a second relay provided with a winding, a normally open contact for connecting the heating resistance operatively to the power line when closed and a second normally open contact, an annular core of permeable material, an output winding wound on the core, a control winding wound on the core, a bias winding wound on the core, a feedback winding wound on the core, a thermocouple responsive to heat from the heating resistance and connected in series with the control winding for creating flux in a predetermined direction in the core, an adjustable resistance, means connecting the adjustable resistance and the second normally open contact in parallel to one conductor of the power line and the output winding, rectifier means connecting the other conductor of the power line to the output winding, the feedback winding and first relay winding in series with the output winding for creating flux in the core in the same direction as that created by the control winding, and rectifier means connecting the bias winding to the power line in such a manner that flux created by the bias winding opposes that created by the feedback winding and the control winding.

5. A circuit for controlling the temperature of a soldering iron, which comprises a heating resistance, an A. C. power line including a pair of conductors, a relay provided with a winding and a normally closed contact, a second relay provided with a winding, a normally open contact for connecting the heating resistance operatively to the power line and a second normally open contact, a core of permeable material, an output winding wound on the core, a control winding wound on the core, a bias winding wound on the core, a feedback winding wound on the core, a thermocouple responsive to heat from the resistance and connected in series with the control winding for creating flux in a predetermined direction in the core, an adjustable resistance connected in series with the thermocouple and the control winding, a high resistance shunting the control winding, a second adjustable resistance, means connecting the second adjustable resistance and the second normally open relay contact in parallel to one conductor of the power line and the output winding, rectifier means connecting the other conductor of the power line to the output winding, the feedback winding and the first relay winding in series with the output winding for creating flux in the core in the same direction as that created by the control winding, and rectifier means connecting the bias winding to the power line in such a manner that flux created by the bias winding opposes that created by the feedback winding and the control winding.

6. A circuit for controlling the temperature of an electrical soldering iron, which comprises a resistance for heating the soldering iron, a thermocouple responsive to the temperature of the soldering iron, an A. C. power line, current sensitive relay means for connecting the resistance to the power line when not actuated and disconnecting the resistance from the power line when actuated, a magnetic amplifier having a control winding supplied with power from the thermocouple and an output winding connected to the power line for limiting current to the relay means to a non-actuating value when the voltage of the thermocouple is below a predetermined value and permitting current of an actuating value when the voltage of the thermocouple is above a predetermined value, and means actuable by the relay means for maintaining the voltage applied to the output winding substantially uniform both at the load voltage and the no load voltage of the power line.

7. A circuit for controlling the temperature of an electrical soldering iron, which comprises a resistance for heating the soldering iron, a thermocouple responsive to the temperature of the soldering iron, an A. C. power line, relay means for connecting the resistance to the power line when not actuated and disconnecting the resistance from the power line when actuated, a magnetic amplifier having a control winding supplied with power from the thermocouple and an output winding connected to the power line for limiting current to the relay means to a non-actuating value when the voltage of the thermocouple is below a predetermined value and permitting current of an actuating value when the voltage of the thermocouple is above a predetermined value, and means actuable by the relay means for compensating for voltage drop of the power line under load to control the voltage applied to the output winding.

8. A control circuit, which comprises a power source, a heating resistance, relay means for connecting the resistance to the power source, a thermocouple responsive to heat from the resistance, magnetic amplifying means responsive to the thermocouple provided with an output winding in series with the relay means and the power source for actuating the relay means to disconnect the resistance from the power source when the thermocouple is at a predetermined temperature, a second resistance connected to the power source in series with the output winding, and means operable by the relay means when actuated for shunting the second resistance to cause the relay means to drop out earlier than it would otherwise.

9. A control circuit, which comprises an A. C. power source, an electrical heating element, relay means normally connecting the heating element to be controlled to the power source for disconnecting the heating element from the power source, a magnetic amplifier having a saturable core, a control winding and an output winding connected to the power source and the relay means for limiting current to the relay means, a thermocouple responsive to heat from the heating element connected to the control winding for causing saturation of the core when heated to a predetermined temperature to reduce the inductive reactance of the output windings, thereby actuating the relay means, impedance means connected in series with the output winding and the power source, and means operable on actuation of the relay means for shunting the impedance means to reduce the saturation of the core to decrease current to the relay means, thereby narrowing the range of temperature through which the thermocouple is heated.

References Cited in the file of this patent

UNITED STATES PATENTS

| | | |
|---|---|---|
| 915,974 | Leonard | Mar. 23, 1909 |
| 1,582,702 | Stoekle et al. | Apr. 27, 1926 |
| 1,730,254 | Thomas | Oct. 1, 1929 |
| 1,910,381 | Dowling | May 23, 1933 |
| 2,086,120 | Croden | July 6, 1937 |
| 2,216,595 | McCarty | Oct. 1, 1940 |
| 2,266,569 | Schneider et al. | Dec. 16, 1941 |
| 2,429,827 | Lamm | Oct. 28, 1947 |
| 2,568,411 | Reed | Sept. 18, 1951 |